United States Patent [19]

Robert

[11] 4,289,508
[45] Sep. 15, 1981

[54] DEVICE FOR FILTERING AND FOR HUMIDIFYING THE ADMISSION AIR OF AN INTERNAL COMBUSTION ENGINE

[76] Inventor: Ramon C. Robert, 16, avenue de Chatelaine, Geneva, Switzerland

[21] Appl. No.: 144,560

[22] Filed: Apr. 28, 1980

[30] Foreign Application Priority Data

May 4, 1979 [CH] Switzerland ............................ 4184/79

[51] Int. Cl.³ ............................................. B01D 47/00
[52] U.S. Cl. ........................................ 55/234; 261/99; 261/107; 123/25 A
[58] Field of Search ................... 55/234, 510; 261/99, 261/107, 18 A; 123/25 A, 25 R

[56] References Cited

U.S. PATENT DOCUMENTS

| | | | |
|---|---|---|---|
| 1,250,280 | 12/1917 | Carpenter | 55/234 |
| 2,108,556 | 2/1938 | Hardt | 123/25 A |
| 2,122,414 | 7/1938 | Foster | 123/25 A |
| 2,669,319 | 2/1954 | Inglesbg | 55/234 |
| 3,371,785 | 3/1968 | Hanami | 261/107 |
| 3,991,724 | 11/1976 | Geiser | 123/25 A |

FOREIGN PATENT DOCUMENTS 2261041 10/1975 France .................................. 55/510

*Primary Examiner*—Bernard Nozick
*Attorney, Agent, or Firm*—Emory L. Groff, Jr.

[57] ABSTRACT

An air filter comprising, in addition to a porous paper annular filter, a filter in the form of a canopy disposed above the air outlet orifice. This filter comprises a trellis forming a support for absorbent material meshes extending into a water tank. The meshes become wet by absorbing the water from the tank by capilliary action and ensure, by forced convection, a humidification of the air aspirated by the engine.

3 Claims, 2 Drawing Figures

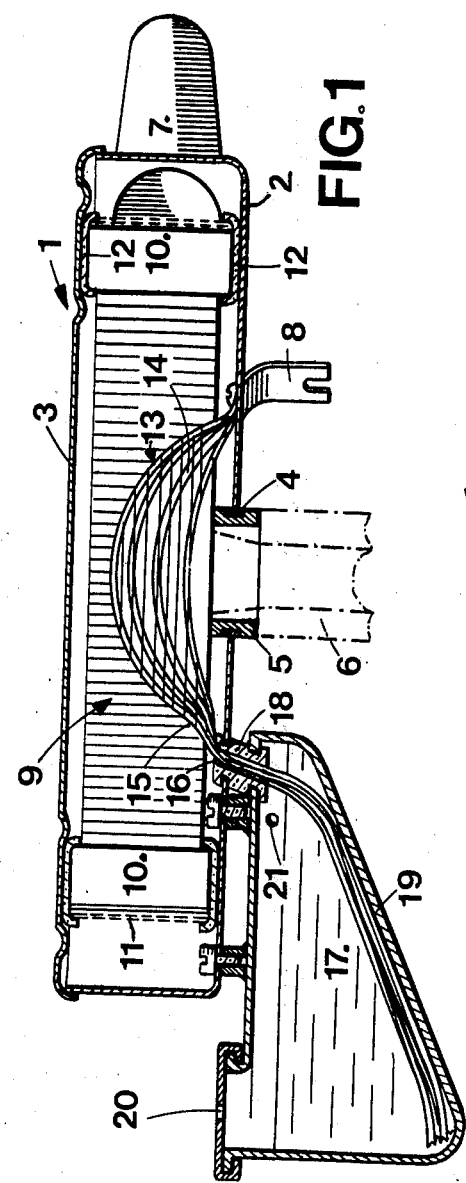
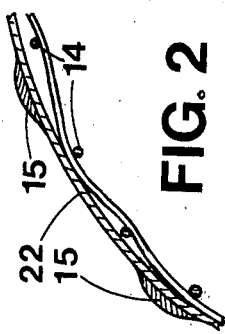

DEVICE FOR FILTERING AND FOR HUMIDIFYING THE ADMISSION AIR OF AN INTERNAL COMBUSTION ENGINE

Filtering devices are known comprising a casing, with an air inlet conduit and an air outlet orifice, and a filter disposed on the air passage between the inlet conduit and the outlet orifice.

It is known that it is advantageous to add water to the mixture of combustible fuel and air in internal combustion engines. This addition of water, in very small quantities, produces a reduction in the combustion temperature of the mixture and plays an anti-explosive role.

It has been shown moreover that there is an improvement in the engine performance and, consequently, a reduction in its fuel consumption.

The known devices permitting the addition of water to the mixture generally necessitate a modification or a special arrangement of the inlet members for the fuel/air mixture in the engine.

Certain devices have a water supply tube coming from a constant level tank and connected to the air inlets in the engine, so that the water is aspirated by the vacuum present in these tubes. A water feed pump brings the water from a reservoir to the said tank.

Direct or indirect water injection devices have likewise been proposed. These devices comprise an injection pump served by regulating means. In a general manner, the known devices are complex arrangements of movable members and are expensive, in so far as concerns their cost price, their installation, and their maintenance.

The object of the invention is to equip existing engines with a cheap device for the addition of water to combustion air, only necessitating minor modifications in the inlet members and not comprising any movable parts.

According to the present invention there is provided a device for filtering and for humidifying the admission air of an internal combustion engine, comprising a casing, with an air inlet conduit and an air outlet orifice, a filter disposed on the air passage between the inlet conduit and the outlet orifice, and absorbent material elements disposed in the air passage, these elements having portions extending into a water recipient.

The present invention will be described further, by way of example, with reference to the accompanying drawings, in which:

FIG. 1 is a transverse cross-section of a filtering device; and

FIG. 2 is a partial cross-section of a modification of the filtering device.

The filtering device illustrated in the drawing is constituted by a circular casing 1 comprising a base 2 and a cover 3. The base 2 has an air outlet orifice 4 surrounded on its edge with a tight joint 5 adapted to the dimension of a carburettor channel 6. The casing 1 has an air inlet conduit 7 opening in its lateral face, and engine fixing brackets 8. An annular filter 9 is placed in known manner in the casing 1. This filter 9 is constituted by a band of porous paper 10 folded zig-zag along the internal face of a circular trellis 11, the borders of the bands of paper 10 and of the trellis 11 being embedded in synthetic or natural latex haunches 12.

A second filter 13 in the form of a canopy is disposed above the air outlet orifice 4 and is fixed to the base 2 of the casing 1. This second filter 13 comprises a metallic trellis 14 forming a support for absorbent material meshes 15. These meshes 15 are disposed in a manner spaced apart one from the other on the trellis 14 and are bundled together near a hole 16 made in the base 2 of the casing 1.

A water tank 17 is disposed below the casing 1, with a conduit 18 providing communication between this tank 17 and the casing 1 through the hole 16. Each mesh 15 has a portion 19 extending through the hole 16 and the conduit 18 and lying over the base of the water tank 17.

Preferably, the meshes 15 are combined in a sheath connecting the hole 16 in the base 2 of the casing 1 to the base of the tank 17, which increases the capillary effects. This sheath is, preferably, provided with perforations near the hole 16 in the base 2 of the casing 1 to avoid a funnel effect producing a strong suction of a large quantity of water from the tank 17 into the casing 1. The tank 17 has a filling opening provided with a plug 20 and has, in its wall, an orifice 21 constituting, on the one hand, an overflow and, on the other hand, a hole for maintaining the tank 17 at atmospheric pressure.

When the tank 17 contains water, the meshes 15, extensions 19 of which extend to the base of the tank 17, absorb water and by capillary action and effect a humidification by forced air convection traversing the filter 13.

The quantity of water added to the air depends on the relative humidity of this air, the device described above ensures a water content, in the air downstream of the filter 13, near to saturation, whatever the atmospheric conditions may be. In fact, the drier the admitted air, the greater is the quantity of water added to this air. On the other hand, when the ambient air is of high humidity, the water brought by forced convection is negligible.

In the filtering device described above, the oil strainer tube, not shown, discharges downstream of the filter 13, so as not to soil the meshes 15 with drops of oil.

Numerous variants of the device forming the subject of the invention can be envisaged. A device could be envisaged provided only with a filter 13, but the annular filter 9 is preferable, as it eliminates a large quantity of the dust admitted by the inlet orifice 7, which dust may damage the engine.

The filter 13 could alternatively be annular and disposed against the internal face of the filter 9, or the filters 9 and 13 could be constituted by a single, unitary member, the extensions of the meshes being introduced into the tank 17 during the installation of the filter.

A filter 13, of the same type as the annular filter 9 could be envisaged, the paper of which would be put in contact with meshes sunk into the water tank during the fitting of the filter in the casing 1.

A filter 13 could also be envisaged in which the meshes 15 are in contact with a material 22 disposed against the trellis 14, as is shown in FIG. 2, and this material 22 could likewise cover the meshes 15 and the trellis 14. The metallic trellis 14 could be replaced by a perforated metal sheet or a suitable support adapted to maintain the meshes 15 in the air admission passage.

I claim:

1. A device for filtering and humidifying the intake air of an internal combustion engine, comprising a casing including a top wall, bottom wall and side wall, an air inlet conduit in said side wall, an air outlet orifice in said bottom wall, a first filter in said casing in the flow path of intake air between said inlet conduit and said outlet orifice, a second filter comprising a plurality of absorbent material elements, a water tank attached to the outside of the bottom wall of said casing, conduit means connecting said tank to the interior of said casing, a portion of said second filter absorbent material elements disposed in said casing in the flow path of exit air, another portion of said absorbent material elements passing through said conduit means to said water tank and submersed therein to absorb water by capillary action and thereby humidify the air aspirated by said internal combustion engine.

2. A device according to claim 1 wherein, said tank is provided with a vent hole to maintain it at atmospheric pressure.

3. A device according to claim 1 including, a trellis above said air outlet orifice and supporting said portion of the absorbent material elements within said casing.

* * * * *